(12) United States Patent
Ott

(10) Patent No.: US 7,010,232 B1
(45) Date of Patent: Mar. 7, 2006

(54) REMOVABLE OPTICAL INTERFACE MODULES

(75) Inventor: Christopher C. Ott, Briarcliff, TX (US)

(73) Assignee: Cisco Technology, Inc., San Jose, CA (US)

( * ) Notice: Subject to any disclaimer, the term of this patent is extended or adjusted under 35 U.S.C. 154(b) by 808 days.

(21) Appl. No.: 09/742,801

(22) Filed: Dec. 20, 2000

(51) Int. Cl.
*H04B 10/00* (2006.01)

(52) U.S. Cl. ..................... 398/164; 398/154
(58) Field of Classification Search .......... 361/752, 361/760; 398/164, 142; 385/88, 89
See application file for complete search history.

(56) References Cited

U.S. PATENT DOCUMENTS

| | | | |
|---|---|---|---|
| 4,199,222 A * | 4/1980 | Ikushima et al. ............. 385/92 |
| 4,733,093 A * | 3/1988 | Graves et al. ............... 250/551 |
| 4,850,044 A * | 7/1989 | Block et al. ................ 398/118 |
| 4,870,637 A * | 9/1989 | Follett et al. ................ 398/52 |
| 4,953,930 A * | 9/1990 | Ramsey et al. ............... 385/14 |
| 5,032,898 A * | 7/1991 | Bowen et al. ............... 257/433 |
| 5,069,522 A * | 12/1991 | Block et al. ................. 385/39 |
| 5,155,784 A * | 10/1992 | Knott ......................... 385/88 |
| 5,168,537 A * | 12/1992 | Rajasekharan et al. ....... 385/89 |
| 5,452,390 A * | 9/1995 | Bechtel et al. ............... 385/92 |
| 5,488,682 A * | 1/1996 | Sauter et al. ................. 385/53 |
| 5,572,348 A * | 11/1996 | Carlson et al. ............... 398/71 |
| 5,625,238 A | 4/1997 | Ady et al. .................. 307/147 |
| 5,960,141 A * | 9/1999 | Sasaki et al. ................ 385/88 |
| 5,985,185 A * | 11/1999 | Steijer et al. ................ 264/1.7 |
| 6,149,465 A | 11/2000 | Berg et al. .................. 439/630 |
| 6,267,606 B1 * | 7/2001 | Poplawski et al. ........... 439/92 |
| 6,304,436 B1 | 10/2001 | Branch et al. .............. 361/683 |
| 6,345,986 B1 * | 2/2002 | Follingstad et al. .......... 439/64 |
| 6,507,022 B1 | 1/2003 | Salmond et al. ........ 250/339.06 |
| 6,567,590 B1 * | 5/2003 | Okada et al. ................ 385/49 |
| 6,570,982 B1 * | 5/2003 | Weir .......................... 379/327 |
| 6,648,693 B1 | 11/2003 | Hogan et al. ............... 439/630 |

* cited by examiner

*Primary Examiner*—M. R. Sedighian
(74) *Attorney, Agent, or Firm*—Baker Botts L.L.P.

(57) ABSTRACT

An optical line interface assembly for insertion in a slot of a communications equipment rack includes a board having serial interfaces formed to couple to optical interface modules. The interface assembly also includes optical interface modules removably coupled to the serial interfaces to permit replacement of selected optical interface modules while the remaining optical interface modules remain coupled to optical signal lines.

22 Claims, 1 Drawing Sheet

REMOVABLE OPTICAL INTERFACE MODULES

TECHNICAL FIELD OF THE INVENTION

The present invention relates generally to optical interface cards and more particularly to removable optical interface modules.

BACKGROUND OF THE INVENTION

To provide data transmission rates demanded by modern technologies, many communications systems now incorporate fiber optic communications lines. Fiber optic lines can transport vast quantities of information. However, the optical signals from fiber lines must be converted to electrical signals for use by standard computing devices. Thus, networks include optical interface cards that contain one or more fiber interfaces. These cards also contain "framers" to convert between electrical network traffic and streaming optical data. Given a failure of one or more of a optical interfaces on a card, the card must be replaced. This may result in disruptions in communications provided by the interface card.

SUMMARY OF THE INVENTION

In accordance with the present invention, techniques for providing removable optical interface modules are provided which substantially eliminate or reduce disadvantages and problems associated with previous optical interface cards. In a particular embodiment, the present invention satisfies a need for a removable optical interface module that permits replacement of individual optical interfaces on an interface card without disrupting the operation of remaining optical interfaces on the card. More specifically, according to particular embodiments, removable optical interface modules may couple to interface cards using industry standard connectors.

According to one embodiment of the present invention, an optical line interface assembly for insertion in a slot of a communications rack includes a board having a connectors each formed to couple to an optical interface module. The board also has a network interface and a conversion module linking the connectors and the network interface, with the conversion module operating to convert signals between an optical protocol and an electrical protocol. The assembly also includes optical interface modules, with each optical interface module having at least one optical line interface that couples to an optical signal line. The optical interface modules removably couple to the connectors to permit replacement of a selected one of the optical interface modules while another of the optical interface modules remains coupled to an associated optical signal line and while the network interface remains coupled to a backplane of a communications rack.

According to another embodiment of the present invention, an optical interface module includes at least one optical line interface for coupling to an optical line. The interface module also includes an industry standard connector for removably coupling the optical interface module to an optical interface card and an electrical/optical converter for converting between optical signals communicated by the optical line interface and electrical signals communicated by the connector. More specifically, the connector may be a nine-pin D-Subminiature connector.

Various embodiments of the present invention have numerous technical advantages. According to particular embodiments, individual optical interface modules may be replaced on an optical interface card having multiple optical interface modules. This can reduce replacement costs for optical interface cards having failed or otherwise inoperative modules, since operative components of interface cards may be salvaged while replacing only failed components. Moreover, failed modules may be replaced while an interface card remains in a communications equipment rack. Thus, an individual module may be removed and replaced while other modules remain on the card and coupled to optical lines. This allows replacement of individual modules without disrupting service provided by the other modules. In addition, particular embodiments provide standard connectors for linking optical interface modules to an optical interface card. For example, modules may couple to cards using standard connectors, such as mating, nine-pin D-subminiature connectors or personal computer miniature communications interface adapter (PCMCIA) connectors.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE DRAWINGS

Figure 1:
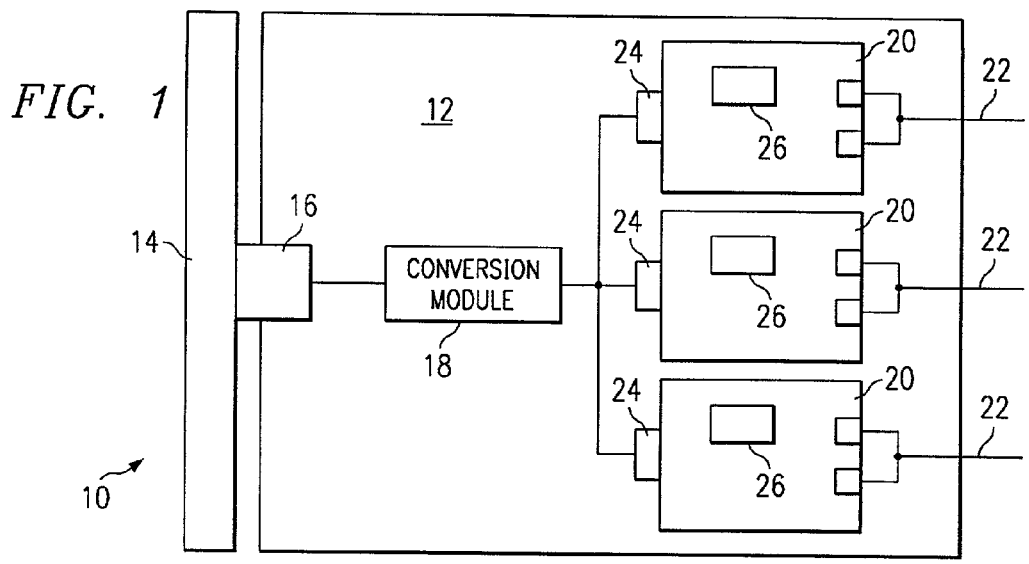
FIG. 1 illustrates an optical interface card coupled to a backplane of a communications equipment rack, with the card having removably coupled optical interface modules.

FIG. 1 illustrates a cross-sectional view of a slot of a communications equipment rack, indicated generally at 10, having an optical interface card 12 coupled to a backplane 14 of the rack. Card 12 includes a network interface 16, a conversion module 18, and optical interface modules 20 removably coupled to card 12 using connectors 24. In general, card 12 provides an interface between optical lines 22 and backplane 14 to provide conversion between optical communications and electrically signaled communications. Interface modules 20 interface directly with optical lines 22 and are removably coupled to card 12 to permit removal and replacement of individual interface modules 20.

Interface modules 20 represent hardware, firmware, and/or logic that couple to optical lines 22 for transmission and receipt of communications using optical signals. Interface modules 20 include optical/electrical converters 26 that convert information between electrical signals and optical signals. For example, interface module 20 may communicate optical signals encoding bit streams on optical lines 22 and communicate electrical signals encoding the bit streams using connectors 24. Optical/electrical converters 26 represent any suitable circuitry, logic, and/or firmware for converting between optical signals and electrical signals.

According to the embodiment illustrated, interface module 20 has two optical interfaces that provide full duplex capabilities. Interface modules 20 couple to connectors 24 to establish electrical connectivity between interface module 20 and other components of card 12. According to a particular embodiment, connectors 24 represent standard connectors such as nine-pin D-subminiature connectors, PCMCIA connectors, or other suitable connectors.

The type of connector 24 for mating with interface modules 20 may correspond to the communications rates and protocols supported by interface module 20. For example, OC-3 optical interfaces may require at least nine-pin connectors, while optical interfaces for higher data rate protocols may require more pins. Thus, card 12 and interface modules 20 may use any suitable arrangement and combination of connectors 24 to permit removal and replacement of interface modules 20, including any suitable standard connector having at least as many pins as needed for the protocol supported by interface module 20.

Conversion module 18 represents hardware, firmware, and/or logic that converts communications between network traffic and serial bit streams. For example, conversion module 18 may support parallel communications using network interface 16 and serial bit stream communications using interface modules 20. According to a particular embodiment, conversion module 18 represents a "framer" that provides asynchronous transfer mode (ATM) cell processing for communications via network interface 16 and provides packet over SONET (POS) communications for serial communications via interface modules 20. Thus, conversion module 18 may receive data as ATM cells using network interface 16 and convert this data into a serial bit stream for communication by interface modules 20. Conversion module 18 may also receive a serial bit stream from interface module 20 and convert the serial bit streams into ATM cells for communication using network interface 16.

According to a particular embodiment, card 12 couples to an electrically signaled, ATM network using network interface 16 and couples to a SONET ring using interface modules 20. Thus, using network interface 16, card 12 receives byte-wide data in the form of ATM cells. Conversion module 18 receives these cells of data and transforms the data into a format for communication by interface modules 20. To convert the data, conversion module 18 appends SONET overhead information and scrambles the signal to effect DC balance. DC balance refers to the frequency of ones and zeros in relation to each other within a signal, with an optimally DC balanced signal having the same number of ones and zeros transmitted. Conversion module 18 also serializes the data and outputs this serial bit stream as an electrical signal to one or more of interface modules 20. Interface module 20 converts the electrical, serial bit stream received from conversion module 18 into an optical, serial bit stream and communicates the optical signal on optical line 22.

Interface modules 20 also operate to receive serial bit streams as optical signals on optical lines 20. For received optical data, components of card 12 perform similar functions to those previously described in reverse order. Interface module 20, upon receiving optical data, converts the received optical signals into electrical, serial data having separated bit-clocks. Interface module 20 communicates the serial bit stream and bit-clocks to conversion module 18. Conversion module 18 performs serial to parallel conversion, descrambles the signal, and performs frame detection on the received data using the bit-clocks. Conversion module 18 then communicates the converted data as network traffic using network interface 16, for example, as ATM cells.

During operation, one or more interface modules 20 may fail. However, remaining interface modules 20 on card 12 may continue to provide service for selected optical lines 22. By removably coupling interface modules 20 to card 12, card 12 permits the removal and replacement of selected interface modules 20 while card 12 remains coupled to backplane 14. In addition, by permitting the replacement of individual interface modules 20, card 12 permits the salvaging of operational components, thus reducing replacement costs associated with inoperative interface modules 20. Moreover, because particular embodiments of card 12 use industry standard connectors 24, card 12 may operate using interface modules 20 produced by various manufacturers in accordance with general specifications that indicate the type of connector, pin-out, and performance requirements to be used.

Although the preceding examples indicate the specific operation of particular components of card 12, these examples illustrate only specific embodiments of card 12. Card 12 may contain any suitable combination and arrangement of various components providing an interface between optical lines 22 and electrically signaled networks, so long as card 12 includes removably coupled interface modules 20 that operate to convert between optical signals and electrical signals.

Figure 2:
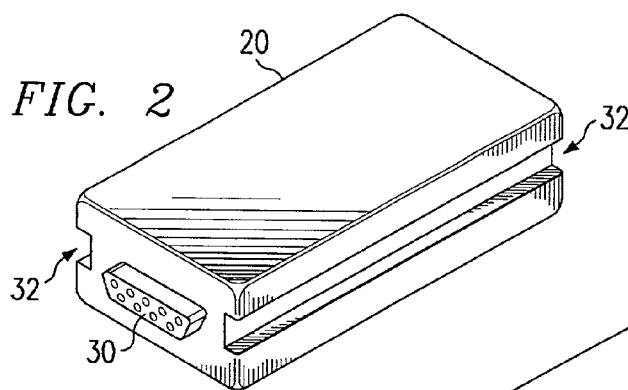
FIG. 2 is an isometric drawing of an exemplary optical interface module having a standard connector.

FIG. 2 is an isometric drawing of a particular embodiment for interface module 20. This view illustrates interface module 20 having a connector 30 for coupling to card 12 and grooves 32 that facilitate the insertion and removal of interface module 20 on card 12. According to this embodiment, connector 30 is a nine-pin D-subminiature connector, either male or female, selected for mating with a corresponding nine-pin connector, either female or male, on card 12. However, as previously discussed, connector 30 of interface module 20 may represent any suitable connector for removably coupling interface module 20 to card 12.

For example, connector 30 may be a fifteen-pin, fifteen-pin high density, twenty-five-pin, or other suitable D-subminiature connector, a small computer systems interface (SCSI) connector, an IDC type connector, a PCMCIA connector, a custom formed connector, or other suitable connector. Certain connectors, such as PCMCIA connectors, are typically elements of assemblies designed for insertion and removal of components. Therefore, certain connector standards may contain specifications for entire assemblies for removably coupling components. Thus, the use of particular connector types may provide predefined specifications for assemblies to facilitate the insertion and removal of interface modules 20. However, card 12 may use any suitable connector 30 and assemblies for removably coupling interface module 20 to card 12.

Thus, grooves 32, illustrated in this figure as channels along the sides of interface module 20, represent only one particular embodiment for a mechanism for securing and aligning interface module 20 on card 12. Interface module 20 may contain any suitable grooves, divots, connectors, clamps, latches, and/or other suitable equipment that facilitates the insertion, securing, and alignment of interface module 20 on card 12.

Figure 3:
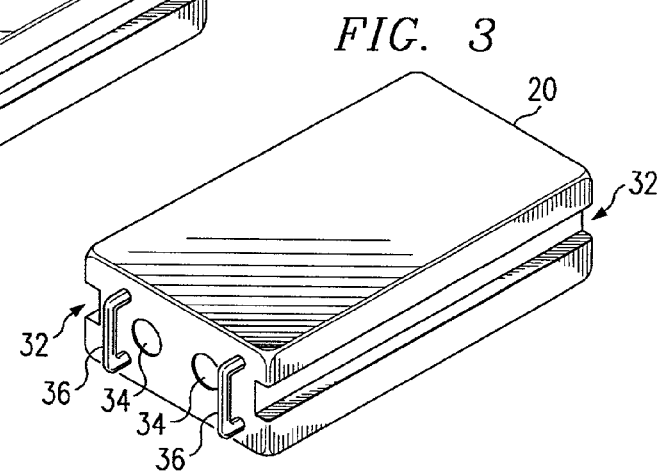
FIG. 3 is an isometric drawing of the reverse side of the exemplary optical interface module.

FIG. 3 is an isometric view illustrating the reverse side of interface module 20 as presented in the preceding illustration. In this illustration, interface module 20 includes grooves 32, optical line interfaces 34, and handles 36. In the embodiment illustrated, interface module 20 includes two optical line interfaces 34 to accommodate a duplex connector coupling two optical interface lines 22 to interface module 20. Thus, according to this embodiment, interface module 20 may support full duplex communications (simultaneous transmission and receipt of optical data).

Handles 36 represent any suitable grips, clasps, latches, or other suitable protuberances or formations on interface module 20 to facilitate the insertion and removal of interface module 20 on card 12. According to a particular embodiment, handles 36 correspond to specific tools designed to facilitate insertion and removal of interface modules 20. However, handles 36 may be formed to support insertion and removal of interface modules 20 by hand or using tools.

Figure 4:
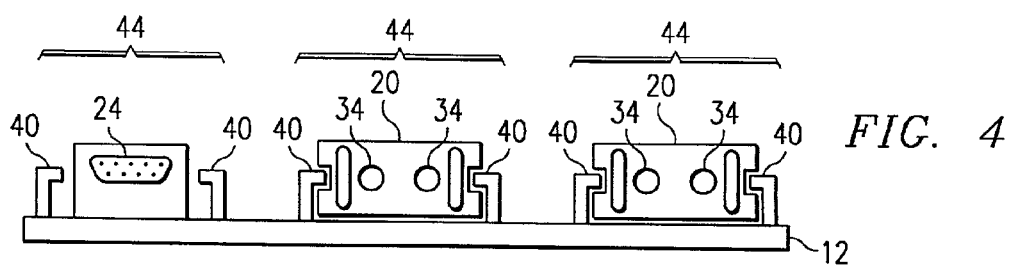
FIG. 4 illustrates a side view of an optical interface card having optical interface modules inserted into two of three available guide slots on the interface card.

FIG. 4 is a side view illustrating card 12 having interface modules 20 inserted into two out of three available slots for accepting interface modules 20. As evident in the particular embodiment illustrated, grooves 32 of interface modules 20 correspond to guides 40 on card 12 to secure and align interface modules 20 on card 12. In addition to guides 40, card 12 includes connectors 24 designed to mate with connectors 30 on interface modules 20. Guides 40 on card 12 form guide slots 44 designed to receive inserted interface modules 20 and to align the inserted modules 20 with connectors 24. Therefore, card 12 and interface modules 20 facilitate the removal and replacement of individual interface modules 20 on card 12. Moreover, an operator may remove and replace individual interface modules 20 on card 12, while card 12 remains coupled to backplane 16 and while remaining interface modules 20 remain coupled to optical lines 22. This permits replacement of failed or otherwise inoperative interface modules 20 without disrupting service provided by remaining interface modules 20 on card 12.

However, as with previous illustrations, guides 40 in this example provide merely a particular embodiment for facilitating the insertion, securing, and coupling of interface modules 20 with card 12. Guide slots 44 may contain any suitable guides, latches, guide slots, grooves, clips, and/or other suitable equipment to facilitate the coupling of connector 30 of interface module 20 to connector 24 of card 12. For example, guide slots 44 may be rectangular enclosures sized to accept interface module 20. Thus, the particular features of card 12 may correspond to designs and/or specifications for interface modules 20.

Although the present invention has been described in several embodiment, a myriad of changes and modifications may be suggested to one skilled in the art, and it is intended that the present invention encompass such changes and modifications as fall within the scope of the present appended claims.

What is claimed is:

1. An optical line interface assembly for insertion in a slot of a communications rack, the assembly comprising:
   a board having a plurality of connectors each formed to couple to an optical interface module, the board further having a network interface and a conversion module linking the connectors and the network interface, the conversion module operable to convert signals between an optical protocol and an electrical protocol; and
   a plurality of optical interface modules, each optical interface module having at least one optical line interface operable to couple to an optical signal line, the optical interface modules removably coupled to the connectors to permit replacement of a selected one of the optical interface modules while another of the optical interface modules remains coupled to an associated optical signal line and while the network interface remains coupled to a backplane of a communications rack.

2. The assembly of claim 1, wherein the board comprises a plurality of guides each operable to receive an inserted one of the optical interface modules and to align the inserted one of the optical interface modules with a corresponding one of the connectors.

3. The assembly of claim 2, wherein each of the guides comprises guide slots, and wherein each of the optical interface modules comprises grooves corresponding to the guide slots.

4. The assembly of claim 1, wherein the connectors are nine-pin D-subminiature connectors, and the optical interface modules comprise mating nine-pin D-subminiature connectors.

5. The assembly of claim 1, wherein the connectors are PCMCIA connectors, and the optical interface modules comprise mating PCMCIA connectors.

6. The assembly of claim 1, wherein the optical interface modules convert between optical serial bit streams and electrical serial bit streams.

7. The assembly of claim 1, wherein a failure rate of the optical interface modules is at least ten times greater than a failure rate of the conversion module.

8. The assembly of claim 1, wherein each of the optical interface modules comprises two optical line interfaces to provide full duplex communications.

9. An optical interface module comprising:
   at least one optical line interface for coupling to an optical line;
   a connector for removably coupling the optical interface module to an optical interface card; and
   an electrical/optical converter operable to convert between optical signals communicated by the optical line interface and electrical signals communicated by the connector;
   wherein the optical line interface receives optical signals that comprise a serial bit stream and a bit-clock; and
   wherein the electrical/optical converter converts the serial bit stream and the bit-clock into electrical signals and communicates the electrical signals via the connector to a framing device on the interface card for conversion into asynchronous transfer mode (ATM) cells.

10. The optical interface module of claim 9, wherein the connector is a nine-pin D-subminiature connector corresponding to a mating nine-pin D-subminiature connector on the interface card.

11. The optical interface module of claim 9, wherein the connector is a PCMCIA connector corresponding to a mating PCMCIA connector on the interface card.

12. The optical interface module of claim 9, further comprising grooves corresponding to guides of the interface card, wherein the grooves facilitate alignment of the connector with a mating connector on the interface card.

13. The optical interface module of claim 9, wherein the connector facilitates removal of the optical interface module from the interface card while the interface card remains coupled to a backplane of a communications equipment rack.

14. A method for replacing an optical interface module of an optical line interface assembly comprising:
   coupling a plurality of optical interface modules to connectors on a board using mating connectors on the optical interface modules;
   coupling the board to a backplane of a communications equipment rack using a network interface, the board having a conversion module linking the connectors and the network interface, the conversion module operable to convert signals between an optical protocol and an electrical protocol;

coupling at least one optical line to each of the optical interface modules;

determining that a selected one of the optical interface modules has failed; and removing the selected optical interface module while the board remains coupled to the backplane.

15. The method of claim 14, wherein the board comprises a plurality of guides each operable to receive an inserted one of the optical interface modules and to align the inserted one of the optical interface modules with a corresponding one of the connectors.

16. The method of claim 15, wherein each of the guides comprises guide slots, and wherein each of the optical interface modules comprises grooves corresponding to the guide slots.

17. The method of claim 14, wherein the connectors are nine-pin D-subminiature connectors.

18. The method of claim 14, wherein the connectors are PCMCIA connectors.

19. The method of claim 14, wherein the optical interface modules convert between optical serial bit streams and electrical serial bit streams.

20. The method of claim 14, wherein a failure rate of the optical interface modules is at least ten times greater than a failure rate of the conversion module.

21. The method of claim 14, wherein each of the optical interface modules comprises two optical line interfaces to provide full duplex communications.

22. An optical line interface assembly for insertion in a slot of a communications rack, the assembly comprising:

a board having a plurality of PCMCIA connectors each formed to couple to an optical interface module, the board further having a plurality of guides each operable to receive an inserted one of a plurality of optical interface modules and to align the inserted one of the optical interface modules with a corresponding one of the PCMCIA connectors, the board further having a network interface and a conversion module linking the PCMCIA connectors and the network interface, the conversion module operable to convert between asynchronous transfer mode (ATM) cells and electrical serial bit streams; and the optical interface modules each operable to convert between electrical serial bit streams and optical serial bit streams, each optical interface module having at least one optical line interface operable to couple to an optical signal line, the optical interface modules removably coupled to the PCMCIA connectors to permit replacement of a selected one of the optical interface modules while another of the optical interface modules remains coupled to an associated optical signal line and while the network interface remains coupled to a backplane of a communications rack;

wherein a failure rate of the optical interface modules is at least ten times greater than a failure rate of the conversion module.

\* \* \* \* \*